United States Patent
Weber et al.

(10) Patent No.: US 8,703,862 B2
(45) Date of Patent: *Apr. 22, 2014

(54) REINFORCED THERMOPLASTIC MOLDING COMPOSITIONS BASED ON POLYARYLENE ETHERS

(75) Inventors: Martin Weber, Maikammer (DE); Christian Maletzko, Altrip (DE); Mark Völkel, Ladenburg (DE)

(73) Assignee: BASF SE (DE)

( * ) Notice: Subject to any disclaimer, the term of this patent is extended or adjusted under 35 U.S.C. 154(b) by 53 days.

This patent is subject to a terminal disclaimer.

(21) Appl. No.: 13/115,513

(22) Filed: May 25, 2011

(65) Prior Publication Data

US 2011/0294912 A1   Dec. 1, 2011

Related U.S. Application Data

(60) Provisional application No. 61/348,248, filed on May 26, 2010.

(51) Int. Cl.
- *C08J 3/02* (2006.01)
- *C08J 3/20* (2006.01)
- *C08K 5/13* (2006.01)
- *C08G 59/00* (2006.01)
- *C08G 65/00* (2006.01)

(52) U.S. Cl.
USPC .......... 524/540; 524/543; 524/609; 524/611; 524/841; 528/104; 528/373; 528/391; 525/535; 525/534; 525/390; 525/392; 264/45.1; 264/45.3

(58) Field of Classification Search
USPC .......... 528/104, 391, 373; 524/540, 543, 609, 524/611, 841; 264/45.1, 45.3; 525/535, 525/534, 390, 392
See application file for complete search history.

(56) References Cited

U.S. PATENT DOCUMENTS

| | | | |
|---|---|---|---|
| 6,051,661 A | 4/2000 | Weber et al. | |
| 7,163,987 B2 | 1/2007 | Weber et al. | |
| 2003/0022964 A1 | 1/2003 | Gallucci | |
| 2011/0155309 A1 | 6/2011 | Steininger et al. | |
| 2011/0201747 A1 | 8/2011 | Weber et al. | |

FOREIGN PATENT DOCUMENTS

| | | |
|---|---|---|
| EP | 855430 A2 | 7/1998 |
| WO | WO-03/033565 A1 | 4/2003 |
| WO | WO-2010/089241 A1 | 8/2010 |
| WO | WO-2010/112508 A1 | 10/2010 |
| WO | WO-2010/128052 A1 | 11/2010 |
| WO | WO-2010/142548 A1 | 12/2010 |
| WO | WO-2010/142585 A1 | 12/2010 |
| WO | WO-2010/146052 A1 | 12/2010 |
| WO | WO-2011/009798 A1 | 1/2011 |
| WO | WO-2011/020823 A1 | 2/2011 |
| WO | WO-2011/051250 A1 | 5/2011 |
| WO | WO-2011/051273 A2 | 5/2011 |
| WO | WO-2011/073197 A1 | 6/2011 |

OTHER PUBLICATIONS

U.S. Appl. No. 13/040,593, filed Mar. 4, 2011, Weber et al.
U.S. Appl. No. 13/053,872, filed Mar. 22, 2011, Weber et al.
U.S. Appl. No. 13/069,839, filed Mar. 23, 2011, Weber et al.
U.S. Appl. No. 13/130,139, filed May 19, 2011, Weber et al.
U.S. Appl. No. 13/140,245, filed Jun. 16, 2011, Weber et al.

*Primary Examiner* — Duc Truong

(74) *Attorney, Agent, or Firm* — Novak Druce Connolly Bove + Quigg LLP

(57) ABSTRACT

The present invention relates to thermoplastic molding compositions composed of the following components:
(A) at least one polyarylene ether (A1) having an average of at most 0.1 phenolic end groups per polymer chain, and at least one polyarylene ether (A2) having an average of at least 1.5 phenolic end groups per polymer chain,
(B) at least one fibrous or particulate filler, and
(C) optionally further additives and/or processing aids.
The present invention further relates to a process for producing the thermoplastic molding compositions of the invention, the use of these for producing moldings, fibers, foams, or films, and to the resultant moldings, fibers, foams, and films.

14 Claims, No Drawings

REINFORCED THERMOPLASTIC MOLDING COMPOSITIONS BASED ON POLYARYLENE ETHERS

CROSS-REFERENCE TO RELATED APPLICATIONS

This Application claims the benefit of U.S. Provisional Application 61/348,248 filed on May 26, 2010 which is incorporated by reference.

BACKGROUND OF THE INVENTION

The present invention relates to thermoplastic molding compositions composed of the following components:
(A) at least one polyarylene ether (A1) having an average of at most 0.1 phenolic end groups per polymer chain, and at least one polyarylene ether (A2) having an average of at least 1.5 phenolic end groups per polymer chain,
(B) at least one fibrous or particulate filler, and
(C) optionally further additives and/or processing aids.

The present invention further relates to a process for producing the thermoplastic molding compositions of the invention, the use of these for producing moldings, fibers, foams, or films, and to the resultant moldings, fibers, foams, and films.

Polyarylene ethers are engineering thermoplastics, and the high heat resistance and high chemicals resistance of these materials lead to their use in very demanding applications. Polyarylene ethers are amorphous and therefore often have inadequate resistance to aggressive solvents. Polyarylene ethers also have high melt viscosity, and this is particularly disadvantageous for processing to give large moldings by means of injection molding. The high melt viscosity is particularly disadvantageous for producing molding compositions with high filler loading or high fiber loading.

Processing to give complex components often requires a marked increase in melt temperature during injection molding, to from 390 to 410° C., and in many instances this causes undesired impairment of the processing properties of the products. The property known as melt stability is used to characterize susceptibility to undesired side-reactions in the melt, where these mostly lead to molecular-weight increase and/or crosslinking. A quantitative parameter for melt stability is in particular available from the ratio of the melt volume flow rate (MVR) determined during two different residence times at a given temperature.

US 2003/0022964 A1 discloses glassfiber-reinforced thermoplastic molding compositions based on polyarylene ether sulfones. The glass fibers were pretreated with a polyolefin wax. The application does not disclose any teaching that relates to the end groups of the polyarylene ether sulfones.

WO 03/033565 A1 discloses thermoplastic molding compositions based on polyarylene ether sulfones with improved melt stability. To this end, polyarylene ether sulfones having units that derive from 1,1,1-tris(4-hydroxyphenyl)ethane are added to the molding compositions. The molding composition can optionally comprise fillers. The application does not disclose any teaching relating to the end groups of the polyarylene ether sulfones.

EP-A 855 430 discloses fiber-reinforced polyarylene ethers which comprise functionalized polyarylene ethers in order to improve toughness. Said products also exhibit improved melt stability, alongside improved toughness. The processing properties of the thermoplastic molding compositions of EP-A 855 430 are not adequate for all applications. In particular, melt stability requires further improvement. The application does not disclose any teaching relating to the end groups of the polyarylene ether sulfones.

BRIEF SUMMARY OF THE INVENTION

The object of the present invention therefore consists in providing reinforced thermoplastic molding compositions based on polyarylene ethers, where these do not have the abovementioned disadvantages, or have these to a lesser extent.

A particular object of the present invention was to provide reinforced thermoplastic molding composition based on polyarylene ethers, where these have better processing stability than the prior art, even at high fiber contents. The thermoplastic molding compositions should in particular have high melt stability. At the same time, the thermoplastic molding compositions should have good mechanical properties, in particular high impact resistance, high tensile strain at break, and high ultimate tensile strength.

The thermoplastic molding compositions of the invention achieve the abovementioned objects. Preferred embodiments can be found in the claims and in the description that follows. The scope of the present invention includes combinations of preferred embodiments.

The thermoplastic molding compositions of the invention are composed of the following components:
(A) at least one polyarylene ether (A1) having an average of at most 0.1 phenolic end groups per polymer chain, and at least one polyarylene ether (A2) having an average of at least 1.5 phenolic end groups per polymer chain,
(B) at least one fibrous or particulate filler, and
(C) optionally further additives and/or processing aids.

DETAILED DESCRIPTION OF THE INVENTION

The thermoplastic molding compositions of the invention are preferably composed of from 15 to 98% by weight of component (A1), from 1 to 15% by weight of component (A2), from 1 to 70% by weight of component (B), and from 0 to 40% by weight of component (C), where the total of the % by weight values for components (A) to (C) is 100% by weight.

It is particularly preferable that the thermoplastic molding compositions of the invention are composed of from 20 to 92% by weight of component (A1), from 3 to 20% by weight of component (A2), from 5 to 60% by weight of component (B), and from 0 to 40% by weight of component (C), where the total of the % by weight values for components (A) to (C) is 100% by weight.

The thermoplastic molding compositions are preferably produced via compounding, i.e. via mixing of the components in a flowable condition. The expression "thermoplastic molding compositions composed of the following components" is accordingly preferably equivalent to "thermoplastic molding compositions obtainable via compounding of the following components".

One of the reasons that the use of polyarylene ethers with a high proportion of phenolic end groups for increasing the melt stability of thermoplastic molding compositions is surprising is that the person skilled in the art would expect disadvantageous side-reactions of the reactive groups. By way of example, the reactivity of the phenolic end groups leads to use of polyarylene ether sulfones of this type as reactive component for epoxy resins.

A more detailed explanation of the individual components now follows.

Component A

In the invention, the thermoplastic molding compositions comprise at least one polyarylene ether (A1) having an average of at most 0.1 phenolic end group per polymer chain, and at least one polyarylene ether (A2) having an average of at least 1.5 phenolic end groups per polymer chain. The term "average" here means number average.

The thermoplastic molding compositions of the invention here preferably comprise at least 15% by weight, particularly at least 20% by weight, in particular at least 25% by weight, of component (A1), and preferably comprise at least 1% by weight, particularly at least 3% by weight, in particular at least 4% by weight, of component (A2), based in each case on the total weight of components (A) to (C).

The thermoplastic molding compositions of the invention preferably moreover comprise at most 98% by weight, particularly at most 92% by weight, in particular at most 85% by weight, of component (A1), and preferably comprise at most 20% by weight, particularly at most 15% by weight, in particular at most 12% by weight, of component (A2), based in each case on the total weight of components (A) to (C).

For the purposes of the present invention, a phenolic end group is a hydroxy group bonded to an aromatic ring and also capable of existence in deprotonated form. The person skilled in the art is aware that a phenolic end group can also be present in the form of what is known as a phenolate end group by virtue of dissociation of a proton as a consequence of exposure to base. The term phenolic end groups therefore expressly comprises not only aromatic OH groups but also phenolate groups.

It is moreover obvious to the person skilled in the art that the phenolic end groups are reactive and can be present in at least to some extent reactive form within the thermoplastic molding compositions.

The proportion of phenolic end groups is preferably determined via potentiometric titration of the polyarylene ether used. For this, the polymer is dissolved in dimethylformamide, and titrated with a solution of tetrabutylammonium hydroxide in toluene/methanol. The end point is determined by a potentiometric method. The proportion of halogen end groups is preferably determined by means of atomic spectroscopy.

The person skilled in the art can use known methods to determine the average number of phenolic end groups per polymer chain ($n^{OH}$), on the assumption of strictly linear polymer chains, using the following formula: $n^{OH}=m^{OH}$ [in % by weight]/$100*M_n^P$ [in g/mol]*$1/17$, starting from the proportion by weight of phenolic end groups, based on the total weight of the polymer ($m^{OH}$) and from the number-average molecular weight ($M_n^P$).

As an alternative, the average number of phenolic end groups per polymer chain ($n^{OH}$) can be calculated as follows: $n^{OH}=2/(1+(17/35.45*m^{Cl}/m^{OH}))$ on the assumption that the end groups present are exclusively OH end groups and Cl end groups, and on the assumption of strictly linear polymer chains, if the proportion by weight of Cl end groups ($m^{Cl}$) is simultaneously known. The person skilled in the art knows how to adapt the calculation methods in the event that end groups other than Cl are present.

Without any intention of restriction, it is believed that the high content of reactive phenolic end groups in component (A2) causes the latter to act as compatibilizer for the components of the thermoplastic molding composition. It is moreover believed that component (A1), which has high content of inert end groups, brings about a further improvement in the property profile of the thermoplastic molding compositions of the invention, the result being that the presence of polyarylene ethers having phenolic end groups on the one hand and of polyarylene ethers having inert end groups on the other hand has a synergistic effect in relation to the final properties of the thermoplastic molding compositions.

Production of polyarylene ethers with simultaneous control of the end groups is known to the person skilled in the art and is described in more detail at a later stage below. The known polyarylene ethers usually have halogen end groups, in particular —F or —Cl, or phenolic OH end groups or phenolate end groups, where the latter can be converted in a known manner into stable end groups, in particular —OCH$_3$ end groups.

It is preferable that the polyarylene ethers (A1) have at most 0.01% by weight, particularly at most 0.005% by weight, of phenolic end groups, based on the amount by weight of component (A1). It is preferable that the polyarylene ethers (A2) have at least 0.15% by weight, in particular at least 0.18% by weight, and particularly at least 0.2% by weight of phenolic end groups, based on the amount by weight of component (A2), in each case calculated in the form of amount by weight of OH.

In each case, the theoretical upper limit for the content of phenolic end groups in components (A1) and, respectively, (A2) is a function of the number of end groups available per molecule (two in the case of linear polyarylene ethers) and of the number-average chain length. The person skilled in the art is aware of corresponding calculations.

It is preferable that the average number of phenolic end groups of component (A1) per polymer chain is from 0 to 0.1, in particular from 0 to 0.08, particularly from 0 to 0.05, and very particularly from 0 to 0.02, and in particular at most 0.01.

It is preferable that the average number of phenolic end groups per polymer chain in component (A2) is from 1.6 to 2, in particular from 1.7 to 2, particularly from 1.8 to 2, and very particularly from 1.9 to 2.

In one particularly preferred embodiment, component (A) is a mixture of from 60 to 99% by weight of polyarylene ether (A1) and of from 1 to 40% by weight of polyarylene ether (A2), based in each case on the amount by weight of component (A).

In said preferred embodiment, it is particularly preferable that component (A) is composed of from 70 to 98% by weight of the constituent (A1) mentioned, in particular from 80 to 97% by weight, and of from 2 to 30% by weight of the constituent (A2) mentioned, in particular from 3 to 20% by weight, based in each case on the amount by weight of component (A).

The polyarylene ethers (A1) and (A2) of the present invention can—except for the end groups—be identical or can be composed of different units and/or can have a different molecular weight, as long as they then remain completely miscible with one another. However, it is preferable that constituents (A1) and (A2) have substantial structural similarity and in particular are composed of the same units, i.e. differ only in the nature of the end groups. It is moreover preferable that constituents (A1) and (A2) have similar molecular weight, and in particular that the number-average molecular weight of one of the components is at most 30% greater than that of the other components.

Polyarylene ethers are a class of polymer known to the person skilled in the art. In principle, any of the polyarylene ethers that are known to the person skilled in the art and/or that can be produced by known methods can be used as constituent of component (A). Appropriate methods are explained at a later stage below. It is preferable that the constituents of component (A) are polyarylene ether sulfones.

Polyarylene ethers (A1) and (A2) preferred for the purposes of component (A) are composed, independently of one another, of units of the general formula I:

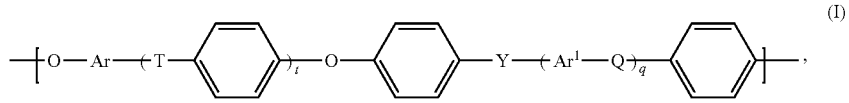

where the symbols t, q, Q, T, Y, Ar and Ar$^1$ are as follows:

t, q: independently of one another 0, 1, 2, or 3,

Q, T, Y: independently of one another in each case a chemical bond or group selected from —O—, —S—, —SO$_2$—, S=O, C=O, —N=N—, and —CR$^a$R$^b$—, where R$^a$ and R$^b$ independently of one another are in each case a hydrogen atom or a C$_1$-C$_{12}$-alkyl, C$_1$-C$_{12}$-alkoxy, or C$_6$-C$_{18}$-aryl group, and where at least one of Q, T, and Y is —SO$_2$—, and Ar, Ar$^1$: independently of one another an arylene group having from 6 to 18 carbon atoms.

If, in compliance with the abovementioned preconditions, Q, T, or Y is a chemical bond, this then means that the group adjacent on the left-hand side and the group adjacent on the right-hand side have direct linkage to one another by way of a chemical bond.

However, it is preferable that Q, T, and Y in formula I are selected independently of one another from —O— and —SO$_2$—, with the proviso that at least one of the group consisting of Q, T, and Y is —SO$_2$—.

If Q, T, or Y is —CR$^a$R$^b$—, R$^a$ and R$^b$ independently of one another are in each case a hydrogen atom or a C$_1$-C$_{12}$-alkyl, C$_1$-C$_{12}$-alkoxy, or C$_6$-C$_{18}$-aryl group.

Preferred C$_1$-C$_{12}$-alkyl groups comprise linear and branched, saturated alkyl groups having from 1 to 12 carbon atoms. The following moieties may be mentioned in particular: C$_1$-C$_6$-alkyl moiety, e.g. methyl, ethyl, n-propyl, isopropyl, n-butyl, sec-butyl, 2- or 3-methylpentyl, and longer chain moieties, e.g. unbranched heptyl, octyl, nonyl, decyl, undecyl, lauryl, and the singly branched or multibranched analogs thereof.

Alkyl moieties that can be used in the abovementioned C$_1$-C$_{12}$-alkoxy groups that can be used are the alkyl groups defined at an earlier stage above having from 1 to 12 carbon atoms. Cycloalkyl moieties that can be used with preference in particular comprise C$_3$-C$_{12}$-cycloalkyl moieties, e.g. cyclopropyl, cyclobutyl, cyclopentyl, cyclohexyl, cycloheptyl, cyclooctyl, cyclopropylmethyl, cyclopropylethyl, cyclopropylpropyl, cyclobutylmethyl, cyclobutylethyl, cyclopentylethyl, -propyl, -butyl, -pentyl, -hexyl, cyclohexylmethyl, -dimethyl, and -trimethyl.

Ar and Ar$^1$ are independently of one another a C$_6$-C$_{18}$-arylene group. On the basis of the starting materials described at a later stage below, it is preferable that Ar derives from an electron-rich aromatic substance that is very susceptible to electrophilic attack, which is preferably selected from the group consisting of hydroquinone, resorcinol, dihydroxynaphthalene, in particular 2,7-dihydroxynaphthalene, and, if t=1, the group Ar-T-phenylene preferably derives from compounds from the group consisting of bisphenol A, bisphenol S, and 4,4'-bisphenol. Ar$^1$ is preferably an unsubstituted C$_6$- or C$_{12}$-arylene group.

Particular C$_6$-C$_{18}$-arylene groups Ar and Ar$^1$ that can be used are phenylene groups, e.g. 1,2-, 1,3-, and 1,4-phenylene, naphthylene groups, e.g. 1,6-, 1,7-, 2,6-, and 2,7-naphthylene, and also the arylene groups that derive from anthracene, from phenanthrene, and from naphthacene.

In the preferred embodiment according to formula I, it is preferable that Ar and Ar$^1$ are selected independently of one another from the group consisting of 1,4-phenylene, 1,3-phenylene, and naphthylene, in particular 2,7-dihydroxynaphthylene.

Preferred polyarylene ethers (A1) and (A2) for the purposes of component (A) are those which comprise at least one of the following repeat units Ia to Io:

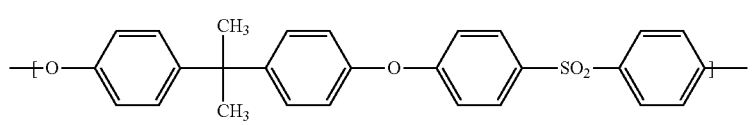

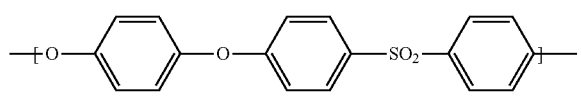

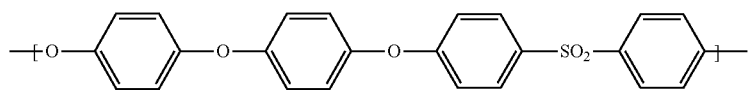

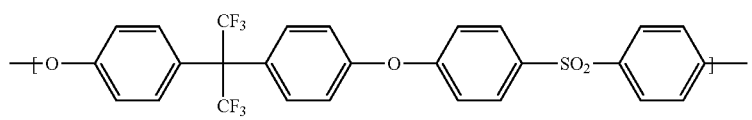

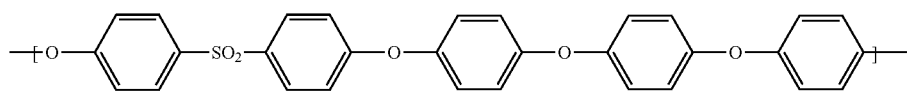

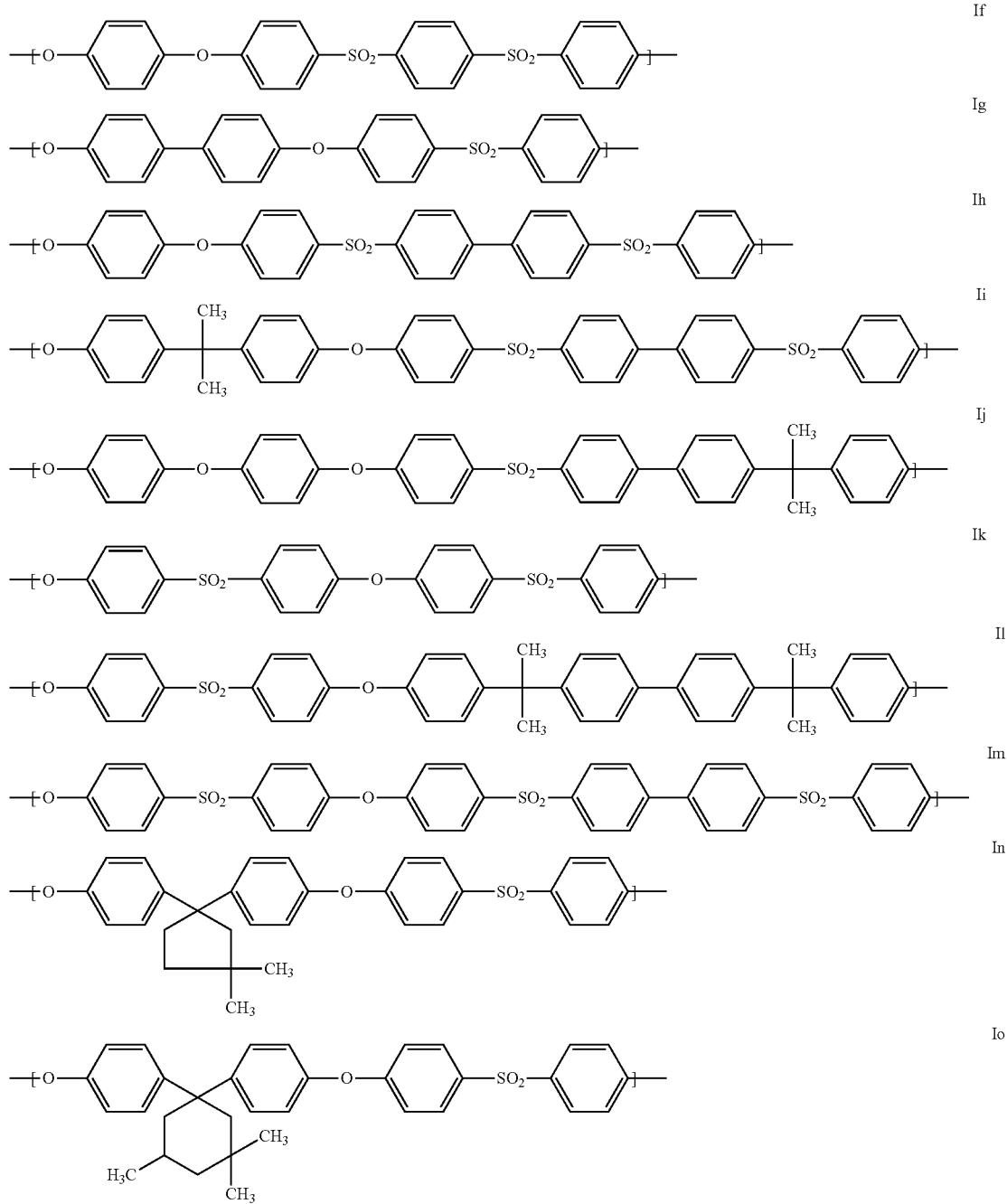

Other units to which preference is given, in addition to the preferred units Ia to Io, are those in which one or more 1,4-phenylene units deriving from hydroquinone have been replaced by 1,3-phenylene units deriving from resorcinol, or by naphthylene units deriving from dihydroxynaphthalene.

The units Ia, Ig, and Ik are particularly preferred as units of the general formula I. It is moreover particularly preferable that the polyarylene ethers of component (A) consist essentially of one type of unit of the general formula I, in particular of one unit selected from Ia, Ig, and Ik.

In one particularly preferred embodiment, Ar=1,4-phenylene, t=1, q=0, T is a chemical bond, and Y=SO$_2$. Particularly preferred polyarylene ether sulfones composed of the abovementioned repeat unit are termed polyphenylene sulfone (PPSU). In this particularly preferred embodiment, in particular, not only component (A1) but also component (A2) is composed of at least one polyarylene ether sulfone of PPSU type.

In another particularly preferred embodiment, Ar=1,4-phenylene, t=1, q=0, T=C(CH$_3$)$_2$ and Y=SO$_2$. Particularly preferred polyarylene ether sulfones composed of the abovementioned repeat unit are termed polysulfone (PSU). In this particularly preferred embodiment, in particular, not only component (A1) but also component (A2) is composed of at least one polyarylene ether sulfone of PSU type.

In another particularly preferred embodiment, Ar=1,4-phenylene, t=1, q=0, T=Y=SO$_2$. Particularly preferred polyarylene ether sulfones composed of the abovementioned repeat unit are termed polyether sulfone (PESU). In this particularly preferred embodiment, in particular, not only component (A1) but also component (A2) is composed of at least one polyarylene ether sulfone of PESU type.

For the purposes of the present invention, abbreviations such as PPSU, PESU, and PSU comply with DIN EN ISO 1043-1:2001.

The average molar masses $M_n$ (number average) of the preferred polyarylene ethers (A1) and (A2) are generally in the range from 5000 to 60 000 g/mol, with relative viscosities of from 0.20 to 1.5 dl/g. The relative viscosities of the polyarylene ethers are determined in 1% strength by weight N-methylpyrrolidone solution at 25° C. to DIN EN ISO 1628-1.

The weight-average molar masses $M_w$ of the polyarylene ethers (A1) and, respectively, (A2) of the present invention are preferably from 10 000 to 150 000 g/mol, in particular from 15 000 to 120 000 g/mol, particularly preferably from 18 000 to 100 000 g/mol, determined by means of gel permeation chromatography in dimethylacetamide solvent against narrowly distributed polymethyl methacrylate as standard.

Production processes that lead to the abovementioned polyarylene ethers are known per se to the person skilled in the art and are described by way of example in Herman F. Mark, "Encyclopedia of Polymer Science and Technology", third edition, volume 4, 2003, pages 2 to 8, and also in Hans R. Kricheldorf, "Aromatic Polyethers" in: Handbook of Polymer Synthesis, second edition, 2005, pages 427 to 443.

Particular preference is given to the reaction, in aprotic polar solvents and in the presence of anhydrous alkali metal carbonate, in particular sodium carbonate, potassium carbonate, calcium carbonate, or a mixture thereof, very particularly preferably potassium carbonate, between at least one aromatic compound having two halogen substituents and at least one aromatic compound having two functional groups reactive toward abovementioned halogen substituents. One particularly suitable combination is N-methylpyrrolidone as solvent and potassium carbonate as base.

It is preferable that the polyarylene ethers (A1) have either halogen end groups, in particular chlorine end groups, or etherified end groups, in particular alkyl ether end groups, these being obtainable via reaction of the OH or, respectively, phenolate end groups with suitable etherifying agents.

Examples of suitable etherifying agents are monofunctional alkyl or aryl halide, e.g. $C_1$-$C_6$-alkyl chloride, $C_1$-$C_6$-alkyl bromide, or $C_1$-$C_6$-alkyl iodide, preferably methyl chloride, or benzyl chloride, benzyl bromide, or benzyl iodide, or a mixture thereof. For the purposes of the polyarylene ethers of component (A1) preferred end groups are halogen, in particular chlorine, alkoxy, in particular methoxy, aryloxy, in particular phenoxy, or benzyloxy.

Production of the polyarylene ethers (A2) is discussed below. A preferred process for producing polyarylene ethers of component (A2) is described hereinafter and comprises the following steps in the sequence a-b-c:
(a) provision of at least one polyarylene ether (A2*) in the presence of a solvent (S), where the content of phenolic end groups in this polyarylene ether is appropriate for the desired component (A2), where the phenolic end groups thereof are present in the form of phenolate end groups, and this polyarylene ether is preferably composed of units of the general formula I as defined above,
(b) addition of at least one acid, preferably of at least one polybasic carboxylic acid, and
(c) obtaining the polyarylene ethers of component (A2) in the form of a solid.

The polyarylene ether (A2*) is preferably provided here in the form of a solution in the solvent (S).

There are in principle various ways of providing the polyarylene ethers (A2*) described. By way of example, an appropriate polyarylene ether (A2*) can be brought directly into contact with a suitable solvent and directly used in the process of the invention, i.e. without further reaction. As an alternative, prepolymers of polyarylene ethers can be used and reacted in the presence of a solvent, whereupon the polyarylene ethers (A2*) described are produced in the presence of the solvent.

However, the polyarylene ether(s) (A2*) is/are preferably provided in step (a) via reaction of at least one starting compound of structure X—Ar$^a$—Y (s1) with at least one starting compound of structure HO—Ar$^b$—OH (s2) in the presence of a solvent (S) and of a base (B), where
Y is a halogen atom,
X is selected from halogen atoms and OH, and
Ar$^a$ and Ar$^b$ independently of one another are an arylene group having from 6 to 18 carbon atoms.

The ratio of (s1) and (s2) here is selected in such a way as to produce the desired content of phenolic end groups. Suitable starting compounds are known to the person skilled in the art or can be produced by known methods.

Hydroquinone, resorcinol, dihydroxynaphthalene, in particular 2,7-dihydroxynaphthalene, 4,4'-dihydroxydiphenyl sulfone, bisphenol A, and 4,4'-dihydroxybiphenyl are particularly preferred as starting compound (s2).

In principle, it is also possible, to a restricted extent, to use trifunctional compounds. In this case, branched structures are produced. If a trifunctional starting compound (s2) is used, preference is given to 1,1,1-tris(4-hydroxyphenyl)ethane.

The quantitative proportions to be used are in principle a function of the stoichiometry of the polycondensation reaction that proceeds, with cleavage of the theoretical amount of hydrogen chloride, and the person skilled in the art adjusts these in a known manner. However, an excess of (s2) is preferable, in order to increase the number of phenolic OH end groups.

In this embodiment, the molar (s2)/(s1) ratio is particularly preferably from 1.005 to 1.2, in particular from 1.01 to 1.15, and very particularly preferably from 1.02 to 1.1.

As an alternative, it is also possible to use a starting compound (s1) having X=halogen and Y=OH. In this case, an excess of hydroxy groups is achieved via addition of the starting compound (s2). In this case, the ratio of the phenolic end groups used to halogen is preferably from 1.01 to 1.2, in particular from 1.03 to 1.15, and very particularly preferably from 1.05 to 1.1.

It is preferable that the conversion in the polycondensation reaction is at least 0.9, so as to provide an adequately high molecular weight. If a prepolymer is used as precursor of the polyarylene ether, the degree of polymerization is based on the number of actual monomers.

Preferred solvents (S) are aprotic polar solvents. The boiling point of suitable solvents is moreover in the range from 80 to 320° C., in particular from 100 to 280° C., preferably from 150 to 250° C. Examples of suitable aprotic polar solvents are high-boiling ethers, esters, ketones, asymmetrically halogenated hydrocarbons, anisole, dimethylformamide, dimethyl sulfoxide, sulfolan, N-ethyl-2-pyrrolidone, and N-methyl-2-pyrrolidone.

The reaction of the starting compounds (s1) and (s2) preferably takes place in the abovementioned aprotic polar solvents (S), in particular N-methyl-2-pyrrolidone.

The person skilled in the art knows per se that the reaction of the phenolic OH groups preferably takes place in the presence of a base (B), in order to increase reactivity with respect to the halogen substituents of the starting compound (s1).

It is preferable that the bases (B) are anhydrous. Particularly suitable bases are anhydrous alkali metal carbonate, preferably sodium carbonate, potassium carbonate, calcium carbonate, or a mixture thereof, and very particular preference is given here to potassium carbonate.

A particularly preferred combination is N-methyl-2-pyrrolidone as solvent (S) and potassium carbonate as base (B).

The reaction of the suitable starting compounds (s1) and (s2) is carried out at a temperature of from 80 to 250° C., preferably from 100 to 220° C., and the boiling point of the solvent provides an upper restriction on the temperature here. The reaction preferably takes place within a period of from 2 to 12 h, in particular from 3 to 8 h.

It has proven advantageous, after step (a) and prior to conduct of step (b), to filter the polymer solution. This removes the salt formed during the polycondensation reaction, and also any gel that may have formed.

It has also proven advantageous for the purposes of step (a) to adjust the amount of the polyarylene ether (A2*), based on the total weight of the mixture of polyarylene ether (A2*) and solvent (S) to from 10 to 70% by weight, preferably from 15 to 50% by weight.

For the purposes of step (b), at least one acid is added, preferably at least one polybasic carboxylic acid, to the polyarylene ether (A2*) from step (a), preferably to the solution of the polyarylene ether (A2*) in the solvent (S).

"Polybasic" means a basicity of at least 2. The basicity is the (optionally average) number of COOH groups per molecule. Polybasic means basicity of two or higher. For the purposes of the present invention, preferred carboxylic acids are dibasic and tribasic carboxylic acids.

The polybasic carboxylic acid can be added in various ways, in particular in solid or liquid form or in the form of a solution, preferably in a solvent miscible with the solvent (S).

The number-average molar mass of the polybasic carboxylic acid is preferably at most 1500 g/mol, in particular at most 1200 g/mol. At the same time, the number-average molar mass of the polybasic carboxylic acid is preferably at least 90 g/mol.

Particularly suitable polybasic carboxylic acids are those according to the general structure II:

HOOC—R—COOH (II), where R represents a chemical bond or a hydrocarbon moiety having from 1 to 20 carbon atoms and optionally comprising further functional groups, preferably selected from OH and COOH.

Preferred polybasic carboxylic acids are $C_4$-$C_{10}$ dicarboxylic acids, in particular succinic acid, glutaric acid, adipic acid, and tricarboxylic acids, in particular citric acid. Particularly preferred polybasic carboxylic acids are succinic acid and citric acid.

In order to provide adequate conversion of the phenolate end groups to phenolic end groups, it has proven advantageous to adjust the amount of the polybasic carboxylic acid(s) used in respect of the amount of the phenolate end groups.

For the purposes of step (b) it is preferable to add a polybasic carboxylic acid so that the amount of carboxy groups is from 25 to 200 mol %, preferably from 50 to 150 mol %, particularly preferably from 75 to 125 mol %, based on the molar amount of phenolic end groups.

If the amount of acid added is too small, the precipitation properties of the polymer solution are inadequate, while any markedly excessive addition can cause discoloration of the product during further processing.

For the purposes of step (c), the polyarylene ether (A2) is obtained in the form of a solid. In principle, various processes can be used for obtaining the material in the form of a solid. However, it is preferable to obtain the polymer composition via precipitation.

The preferred precipitation process can in particular take place via mixing of the solvent (S) with a poor solvent (S'). A poor solvent is a solvent in which the polymer composition is not soluble. This poor solvent is preferably a mixture of a non-solvent and a solvent. A preferred non-solvent is water. A preferred mixture (S') of a solvent with a non-solvent is preferably a mixture of the solvent (S), in particular N-methyl-2-pyrrolidone, and water. It is preferable that the polymer solution from step (b) is added to the poor solvent (S'), the result being precipitation of the polymer composition. It is preferable here to use an excess of the poor solvent. It is particularly preferable that the polymer solution from step (a) is added in finely dispersed form, in particular in droplet form.

If the poor solvent (S') used comprises a mixture of the solvent (S), in particular N-methyl-2-pyrrolidone, and of a non-solvent, in particular water, a preferred solvent:non-solvent mixing ratio is then from 1:2 to 1:100, in particular from 1:3 to 1:50. A mixture of water and N-methyl-2-pyrrolidone (NMP) in combination with N-methyl-2-pyrrolidone as solvent (S) is preferred as poor solvent (S'). An NMP/water mixture in a ratio of from 1:3 to 1:50, in particular 1:30, is particularly preferred as poor solvent (S').

The precipitation process is particularly efficient when the content of the polymer composition in the solvent (S), based on the total weight of the mixture of polymer composition and solvent (S), is from 10 to 50% by weight, preferably from 15 to 35% by weight.

The potassium content of component (A2) is preferably at most 600 ppm. The potassium content is determined by means of atomic spectrometry.

Component B

The thermoplastic molding compositions of the present invention comprise at least one fibrous or particulate filler, the amount thereof preferably being at least 1% by weight, particularly at least 5% by weight, in particular at least 15% by weight, of component (B), based on the entirety of components (A), (B), and (C). The thermoplastic molding compositions of the present invention are preferably composed of at most 70% by weight, particularly at most 60% by weight, and in particular at most 50% by weight, of component (B), based on the entirety of components (A), (B), and (C).

The molding compositions of the invention may especially comprise particulate or fibrous fillers, particular preference being given to fibrous fillers.

Preferred fibrous fillers are carbon fibers, potassium titanate whiskers, aramid fibers, and glass fibers. Glass fibers are very particularly preferred as component (B).

In order to achieve good processability and compatibility, and good reinforcing effect in the polymer matrix, the preferred glass fibers are sized, preferably during shaping thereof during the fiber-drawing process, and specifically with a size that is compatible with component (A) and that improves the adhesion properties of the glass fibers. Appropriate sizes are known per se to the person skilled in the art.

Another function of the sizing agent, alongside the main task of the size, which is to bond the fiber to the polymer matrix, is to ensure that the glass fibers are easy to produce and to process. The size is generally an aqueous solution or dispersion, and in quantitative terms is generally composed mainly of one or more film-formers, or one or more adhesion-promoters, and optionally of further additions, e.g. lubricants, wetting agents, or substances having antistatic action, etc. (see K. L. Loewenstein: The Manufacturing Technology of Continuous Glass Fibers, Elsevier Scientific Publishing Corp. Amsterdam, London, New York, 1973).

Examples of film-forming polymers are epoxy polymers, polyester polymers, polyurethanes, acrylic polymers, vinyl polymers, mixtures of these polymers and copolymers of corresponding monomers, and particular preference is given here to polyurethanes.

Particular preference is given to a combination made of the abovementioned film-formers, in particular polyurethane dispersions, and of adhesion-promoters, preferably organosilane compounds, such as aminoalkyltrialkoxysilanes, since these give good adhesion between component (A) and the glass fiber, and therefore give good mechanical properties of the plastics parts produced from said glassfiber-reinforced thermoplastic molding compositions.

The diameter of the glass fibers used is generally in the range from 6 to 20 µm. The preferred diameter range mentioned also applies when carbon fibers are used.

The form in which the glass fibers are incorporated can either be that of short glass fibers or else that of continuous-filament strands (rovings). The average length of the glass fibers in the finished injection molding is preferably in the range from 0.08 to 5 mm. Other forms in which carbon fibers or glass fibers can be used are textiles, mats, or glass-silk ravings.

Suitable particulate fillers are amorphous silica, carbonates, such as magnesium carbonate and chalk, powdered quartz, mica, a very wide variety of silicates, such as clays, muscovite, biotite, suzoite, tin maletite, talc, chlorite, phlogopite, feldspar, calcium silicates, such as wollastonite, or aluminum silicates, such as kaolin, particularly calcined kaolin.

Preferred particulate fillers are those in which the diameter (maximum diameter through the geometric center) of at least 95% by weight of the particles, preferably of at least 98% by weight, determined on the finished product, is less than 45 µm, preferably less than 40 µm, and the property known as the aspect ratio of the particulate fillers is in the range from 1 to 25, preferably in the range from 2 to 20, determined on the finished product. The aspect ratio is the ratio of particle diameter to thickness (maximum dimension to minimum dimension, in each case through the geometric center).

An example of a method for determining the particle diameters here records electron micrographs of thin sections of the polymer mixture and utilizes at least 25 filler particles, preferably at least 50, for evaluation purposes. The particle diameters can equally be determined by sedimentation analysis, as in Transactions of ASAE, page 491 (1983). It is also possible to use sieve analysis to measure the proportion by weight of the fillers having a diameter less than 40 µm.

Particularly preferred particulate fillers are talc, kaolin, such as calcined kaolin, or wollastonite, or a mixture of two or all of said fillers. Among these, particular preference is given to talc with a proportion of at least 95% by weight of particles with a diameter smaller than 40 µm and with an aspect ratio of from 1.5 to 25, in each case determined on the finished product. Kaolin preferably has a proportion of at least 95% by weight of particles with a diameter smaller than 20 µm, and preferably has an aspect ratio of from 1.2 to 20, in each case determined on the finished product.

The thermoplastic molding compositions can moreover comprise further additives and/or processing aids, as component C.

Component C

The molding compositions of the invention can comprise, as constituents of component (C), auxiliaries, in particular processing aids, pigments, stabilizers, flame retardants, or a mixture of various additives. Other examples of conventional additives are oxidation retarders, agents to counteract decomposition by heat and decomposition by ultraviolet light, lubricants and mold-release agents, dyes, and plasticizers.

It is preferable that component (C) comprises no polymeric organic compounds, and in particular does not comprise those from the class of the polycondensates. Polyarylene sulfides are excluded as constituents of the thermoplastic molding compositions of the invention.

The proportion of component (C) in the molding composition of the invention is in particular from 0 up to 40% by weight, preferably from 0 up to 30% by weight, in particular from 0 up to 20% by weight, very particularly preferably from 0 to 15% by weight, based on the total weight of components (A) to (C). The preferred minimum amount of the constituents of component (C), to the extent that these are comprised by the molding compositions of the invention, depends on the nature of the compounds comprised.

If component (C) includes stabilizers, the proportion of said stabilizers is usually up to 2% by weight, preferably from 0.01 to 1% by weight, in particular from 0.01 to 0.5% by weight, based on the total of the % by weight values for components (A) to (C).

The amounts generally comprised of pigments and dyes are from 0 to 6% by weight, preferably from 0.05 to 5% by weight, and in particular from 0.1 to 3% by weight, based on the total of the % by weight values for components (A) to (C).

Pigments for the coloring of thermoplastics are well known, see for example R. Gächter and H. Müller, Taschenbuch der Kunststoffadditive [Plastics additives handbook], Carl Hanser Verlag, 1983, pages 494 to 510. A first preferred group of pigments that may be mentioned are white pigments, such as zinc oxide, zinc sulfide, white lead [2 $PbCO_3$ . $Pb(OH)_2$], lithopones, antimony white, and titanium dioxide. Of the two most familiar crystalline forms of titanium dioxide (rutile and anatase), it is in particular the rutile form which is used for white coloring of the molding compositions of the invention. Black color pigments which can be used according to the invention are iron oxide black ($Fe_3O_4$), spinel black [$Cu(Cr, Fe)_2O_4$], manganese black (a mixture composed of manganese dioxide, silicon dioxide, and iron oxide), cobalt black, and antimony black, and also particularly preferably carbon black, which is mostly used in the form of furnace black or gas black. In this connection see G. Benzing, Pigmente für Anstrichmittel [Pigments for paints], Expert-Verlag (1988), pages 78 ff.

Particular color shades can be achieved by using inorganic chromatic pigments, such as chromium oxide green, or organic chromatic pigments, such as azo pigments or phthalocyanines. Pigments of this type are known to the person skilled in the art.

Examples of oxidation retarders and heat stabilizers which can be added to the thermoplastic molding compositions according to the invention are halides of metals of group I of the Periodic Table of the Elements, e.g. sodium halides, potassium halides, or lithium halides, examples being chlorides, bromides, or iodides. Zinc fluoride and zinc chloride can moreover be used. It is also possible to use sterically hindered phenols, hydroquinones, substituted representatives of said group, secondary aromatic amines, optionally in combination with phosphorus-containing acids, or to use their salts, or a mixture of said compounds, preferably in concentrations up to 1% by weight, based on the total of the % by weight values for components (A) to (C).

Examples of UV stabilizers are various substituted resorcinols, salicylates, benzotriazoles, and benzophenones, the amounts generally used of these being up to 2% by weight.

Lubricants and mold-release agents, the amounts of which added are generally up to 1% by weight, based on the total of the % by weight values for components (A) to (C), are stearyl alcohol, alkyl stearates, and stearamides, and also esters of pentaerythritol with long-chain fatty acids. It is also possible to use dialkyl ketones, such as distearyl ketone.

The molding compositions of the invention comprise, as preferred constituent, from 0.1 to 2% by weight, preferably from 0.1 to 1.75% by weight, particularly preferably from 0.1 to 1.5% by weight, and in particular from 0.1 to 0.9% by weight (based on the total of the % by weight values for components (A) to (C)) of stearic acid and/or stearates. Other stearic acid derivatives can in principle also be used, examples being esters of stearic acid.

Stearic acid is preferably produced via hydrolysis of fats. The products thus obtained are usually mixtures composed of stearic acid and palmitic acid. These products therefore have a wide softening range, for example from 50 to 70° C., as a function of the constitution of the product. Preference is given to using products with more than 20% by weight content of stearic acid, particularly preferably more than 25% by weight. It is also possible to use pure stearic acid (>98%).

Component (C) can moreover also include stearates. Stearates can be produced either via reaction of corresponding sodium salts with metal salt solutions (e.g. $CaCl_2$, $MgCl_2$, aluminum salts) or via direct reaction of the fatty acid with metal hydroxide (see for example Baerlocher Additives, 2005). It is preferable to use aluminum tristearate.

The sequence in which components (A) to (C) are mixed is per se as desired. The molding compositions of the invention can be produced by known processes, such as extrusion. By way of example, the molding compositions of the invention can be produced by mixing the starting components in conventional mixing apparatuses, such as screw-based extruders, preferably twin-screw extruders, Brabender mixers, Banbury mixers, or kneaders, with subsequent extrusion. The extrudate is cooled and pelletized. The sequence of mixing of the components can be varied. Accordingly, it is possible to premix two, or more than two, components, but it is also possible to mix all of the components together.

In order to maximize homogeneity of the mixture, intensive mixing is advantageous. Average mixing times required for this are generally from 0.2 to 30 minutes at temperatures of from 290 to 400° C., preferably from 300 to 370° C. The extrudate is generally cooled and comminuted.

The thermoplastic molding compositions of the invention can be used advantageously for producing moldings, fibers, foams, or films. The molding compositions of the invention are particularly suitable for producing moldings for household items, or for electrical or electronic components, and also for producing moldings for the vehicle sector, in particular automobiles.

The examples below provide further explanation of the invention, but do not restrict the same.

Examples

The glassfiber-reinforced thermoplastic molding compositions shown in table 1 were produced via mixing of the components below. This was achieved by using a ZSK 25 extruder from Coperion.

The values for modulus of elasticity, ultimate tensile strength, and tensile strain at break of the specimens were determined by the tensile test to ISO 527, on dumbbell specimens.

The impact resistance of the products was determined on ISO specimens, to ISO 179 1eU.

The intrinsic viscosity of the polyarylene ethers was determined in 1%-strength N-methylpyrrolidone solution at 25° C. to DIN EN ISO 1628-1.

The flowability of the thermoplastic molding compositions was determined on the basis of the melt volume flow rate MVR at a temperature of 320° C., using a 21.6 kg weight, to EN ISO 1133. The melting time was 4 minutes.

The following parameters were determined in order to characterize melt stability:

1.) MVR value was measured as described above after a residence time of 4, or else 24, minutes, at 400° C. The resultant difference obtained by subtracting the MVR(4 min) value from the MVR(24 min) value is stated in the unit % as a ratio to the MVR(4 min) value, and is abbreviated to ΔMVR 24/4 in the table.

2.) Apparent viscosity at 410° C. at a shear rate of 1000 $s^{-1}$ was determined as a function of residence time in a capillary rheometer. The apparent viscosity of the melt was determined here at the abovementioned temperature as a function of the shear rate in a capillary viscometer (Göttfert Rheograph 2003 capillary viscometer) using a circular capillary of length 30 mm and a radius of 0.5 mm, an inlet angle of 180° for the nozzle, a diameter of 12 mm for the melt-reservoir vessel, and a preheat time of 5 minutes. This allows melt stability to be assessed under high thermal load. The quotient obtained from the value after 30 and, respectively, 45 minutes and the initial value (after 5 minutes) was determined and is abbreviated in table 1 to η 30/5 and, respectively, η 45/5.

Component A1

Component A1-1 used comprised a polyether sulfone of PESU type with an intrinsic viscosity of 49.0 ml/g (Ultrason® E 1010 from BASF SE). The product used had 0.16% by weight of Cl end groups and 0.21% by weight of $OCH_3$ end groups.

Component A1-2 used comprised a polyphenylene sulfone based on dichlorodiphenyl sulfone and 4,4'-dihydroxybiphenyl (PPSU), with an intrinsic viscosity of 66.5 ml/g. The product had 0.062% by weight of Cl end groups and 0.42% by weight of $OCH_3$ end groups.

Component A2

Component A2-1 used comprised a polyether sulfone (PESU) with an intrinsic viscosity of 55.6 ml/g, which had 1.91 OH end groups per polymer chain (0.20% by weight of OH end groups) and 0.09 Cl end groups per polymer chain (0.02% by weight of Cl end groups).

Component A2-2 used comprised a polyphenylene sulfone (PPSU) with an intrinsic viscosity of 66.8 ml/g, which had 1.97 OH end groups per polymer chain (170 mmol/g of OH end groups) and 0.03 Cl end groups per polymer chain (2 mmol/g of Cl end groups).

Component A2-comp. 3 used comprised a polyether sulfone produced as follows:

577.03 g of 4,4'-dichlorodiphenyl sulfone, 495.34 g of 4,4'-dihydroxydiphenyl sulfone, and 5.73 g of 4,4'-bishydroxyphenylvaleric acid were dissolved under nitrogen in 1053 ml of NMP, and 297.15 g of anhydrous potassium carbonate were admixed. The reaction mixture was heated to 190° C. and kept at said temperature for 6 h. The mixture was then diluted with 1947 ml of NMP. After cooling to T<80° C., the suspension was discharged. Filtration was then used to remove the insoluble constituents. The resultant solution was then precipitated in water. The white powder obtained was then repeatedly extracted with hot water and then dried in vacuo at 140° C. The proportion of DPA units was determined as 0.9 mol %, and the intrinsic viscosity of the product was 46.9 ml/g.

Component A2-comp. 4 used comprised a polyether sulfone produced as follows:

589.95 g of 4,4'-dichlorodiphenyl sulfone, 368.70 g of 4,4'-dihydroxybiphenyl, and 5.73 g of 4,4'-bishydroxyphenylvaleric acid were dissolved under nitrogen in 1538 ml of NMP, and 290.24 g of anhydrous potassium carbonate were admixed. The reaction mixture was heated to 190° C. and kept at said temperature for 4 h. The mixture was then diluted with 1462 ml of NMP. After cooling to T<80° C., the suspension was discharged. Filtration was then used to remove the insoluble constituents. The resultant solution was then precipitated in water. The white powder obtained was then repeatedly extracted with hot water and then dried in vacuo at 140° C. The proportion of DPA units was determined as 0.87 mol %, and the intrinsic viscosity of the product was 74 ml/g.

Component A2-comp. 5 used comprised a polyether sulfone produced as follows:

587.65 g of 4,4'-dichlorodiphenyl sulfone and 500.34 g of 4,4'-dihydroxydiphenyl sulfone were dissolved under nitrogen in 1053 ml of NMP, and 290.24 g of anhydrous potassium carbonate were admixed. The reaction mixture was heated to 190° C. and kept at said temperature for 6 h. The mixture was then diluted with 1947 ml of NMP. After cooling to T<80° C., the suspension was discharged. Filtration was used to remove the insoluble constituents. The resultant solution was then precipitated in water. The white powder obtained was then repeatedly extracted with hot water and then dried in vacuo at 140° C. The proportion of Cl end groups was 0.365% by weight (103 mmol/kg) and the proportion of OH end groups was 0.014% by weight (3.9 mmol/kg), and the intrinsic viscosity of the product was 51.2 ml/g.

Component D

Component D-1 used comprised chopped glass fibers with a staple length of 4.5 mm and with a fiber diameter of 10 μm, which had been provided with a polyurethane size.

TABLE 1

Properties of the thermoplastic molding compositions. The constitution of the thermoplastic molding compositions is stated in parts by weight.

| Component/example | comp. 1 | comp. 2 | 3 | 4 | comp. 5 | comp. 6 | comp. 7 | 8 | 9 |
|---|---|---|---|---|---|---|---|---|---|
| A1-1 | 70 | 65 | 65 | 62.5 | — | — | — | — | — |
| A1-2 | — | — | — | — | — | 70 | 65 | 65 | 62.5 |
| A2-1 | — | — | 5 | 7.5 | — | — | — | — | — |
| A2-2 | — | — | — | — | — | — | — | 5 | 7.5 |
| A2-comp. 3 | — | 5 | — | — | — | — | — | — | — |
| A2-comp. 4 | — | — | — | — | — | — | 5 | — | — |
| A2-comp. 5 | — | — | — | — | 70 | — | — | — | — |
| D-1 | 30 | 30 | 30 | 30 | 30 | 30 | 30 | 30 | 30 |
| Modulus of elasticity [GPa] | 9.2 | 9.1 | 9.2 | 9.2 | 9.1 | 8.3 | 8.3 | 8.3 | 8.3 |
| Tensile strain at break [%] | 2.1 | 2.4 | 2.4 | 2.5 | 2.1 | 2.3 | 2.9 | 2.7 | 2.8 |
| Ultimate tensile strength [MPa] | 143 | 153 | 154 | 153 | 144 | 118 | 127 | 126 | 127 |
| ISO 179 1eU [kJ/m$^2$] | 49 | 53 | 54 | 55 | 48 | 45 | 61 | 56 | 57 |
| MVR [ml/10 min] (320° C., 21.6 kg) | 39 | 37 | 41 | 43 | 38 | 8.5 | 8.0 | 9.4 | 9.5 |
| ΔMVR 24/4 400° C. [%] | 31 | 26 | 12 | 10 | 56 | 43 | 40 | 30 | 26 |
| η 30/5 at 410° C. | 2.5 | 2.4 | 1.6 | 1.5 | 2.7 | 2.6 | 2.5 | 1.9 | 1.8 |
| η 45/5 at 410° C. | 4.7 | 4.6 | 3.1 | 3.0 | 4.9 | 5.7 | 5.1 | 3.4 | 3.2 |

The molding compositions of the invention feature markedly improved melt stability together with good mechanical properties.

The invention claimed is:

1. A thermoplastic molding composition which comprises the following components:
    (A) at least one polyarylene ether (A1) having an average of at most 0.1 phenolic end groups per polymer chain, and at least one polyarylene ether (A2) having an average of at least 1.5 phenolic end groups per polymer chain,
    (B) at least one fibrous or particulate filler, and
    (C) optionally further additives and/or processing aids.

2. The thermoplastic molding composition according to claim 1, wherein the polyarylene ether(s) (A1) have an average of at most 0.05 phenolic end group per polymer chain.

3. The thermoplastic molding composition according to claim 1, wherein the polyarylene ether(s) (A2) have an average of at least 1.7 phenolic end groups per polymer chain.

4. The thermoplastic molding composition according to claim 1, which comprises from 20 to 92% by weight of component (A1), from 3 to 20% by weight of component (A2), from 5 to 60% by weight of component (B), and from 0 to 40% by weight of component (C), wherein the total of the % by weight values for components (A), (B), and (C) is 100% by weight.

5. The thermoplastic molding composition according to claim 1, wherein the polyarylene ethers of components (A1) and (A2) are polyarylene ether sulfones.

6. The thermoplastic molding composition according to claim 1, wherein the polyarylene ethers of components (A1) and (A2) are, independently of one another, composed of units of the general formula I:

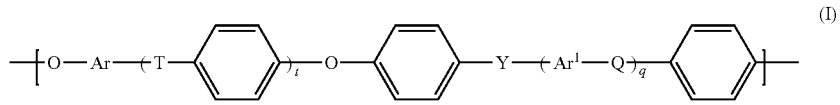

(I)

where the definitions are as follows:

t and q: independently of one another 0, 1, 2, or 3,

Q, T and Y: independently of one another in each case a chemical bond or group selected from —O—, —S—, —SO$_2$—, S=O, C=O, —N=N—, and —CR$^a$R$^b$—, where R$^a$ and R$^b$ independently of one another are in each case a hydrogen atom or a C$_1$-C$_{12}$-alkyl, C$_1$-C$_{12}$-alkoxy, or C$_6$-C$_{18}$-aryl group, and where at least one of Q, T, and Y is —SO$_2$—, and Ar and Ar$^1$: independently of one another a C$_6$-C$_{18}$-arylene group.

7. The thermoplastic molding composition according to claim 6, wherein the polyarylene ethers (A1) and (A2) are composed of the same units according to the general formula I.

8. The thermoplastic molding composition according to claim 6, wherein Q, T, and Y in formula (I) have been selected independently of one another from —O— and —SO$_2$—, and at least one of Q, T, and Y is —SO$_2$—.

9. The thermoplastic molding composition according to claim 6, wherein Ar and Ar$^1$ in formula (I) have been selected independently of one another from the group consisting of 1,4-phenylene, 1,3-phenylene, naphthylene, and 4,4'-bisphenylene.

10. The thermoplastic molding composition according to claim 1, wherein component (B) is composed of glass fibers.

11. The thermoplastic molding composition according to claim 9, wherein component (B) is composed of glass fibers.

12. A process for producing thermoplastic molding compositions according to claim 1, comprising mixing of components (A) to (C) in a mixing apparatus.

13. A process for producing a molding, a fiber, a foam, or a film which comprises utilizing the thermoplastic molding composition according to claim 1.

14. A molding, fiber, foam, or film comprising the thermoplastic molding composition according to claim 1.

* * * * *